United States Patent [19]

Rice

[11] Patent Number: 4,854,016
[45] Date of Patent: Aug. 8, 1989

[54] DEVICE FOR CLAMPING THE EDGE OF A TABLE TOP

[76] Inventor: Paul Rice, c/o XRE Corp., 300 Foster St., Littleton, Mass. 01460

[21] Appl. No.: 124,908

[22] Filed: Nov. 24, 1987

[51] Int. Cl.$^4$ .............................................. A41F 1/00
[52] U.S. Cl. ....................................... 24/495; 24/494; 24/514; 248/231.3; 248/231.5; 403/373; 403/110
[58] Field of Search ................. 24/495, 457, 490, 494, 24/496, 499, 500, 502, 514, 516, 511, 539, 568, 463; 248/231.3, 231.5, 316.5; 403/131, 373, 338, 110

[56] References Cited

U.S. PATENT DOCUMENTS

| | | | |
|---|---|---|---|
| 483,808 | 10/1892 | Leger | 248/316.5 X |
| 1,202,575 | 10/1916 | Parker et al. | 24/494 |
| 1,795,540 | 3/1931 | Brown | 24/514 X |
| 2,995,794 | 8/1961 | Hacking | 24/494 |
| 4,497,092 | 2/1985 | Hoshino | 24/514 |
| 4,753,128 | 6/1988 | Bartlett et al. | 403/131 X |

FOREIGN PATENT DOCUMENTS 219982 8/1958 Australia ................................ 24/495
2857 12/1891 United Kingdom ................. 24/514

Primary Examiner—Kenneth J. Dorner
Assistant Examiner—Laurie K. Cranmer
Attorney, Agent, or Firm—M. Lawrence Oliverio

[57] ABSTRACT

A device for clamping the edge of a diagnostic table top comprising a clamping block mechanism having an inside face for abutting the side edge of the table top; a first jaw mechanism connected to the clamping block mechanism having an inner face for abutting one of the top or the bottom surfaces of the table top; a second jaw mechanism pivotably connected to the clamping block mechanism having an inner face for abutting the other of the top or bottom surfaces of the table top; the second jaw mechanism being connected to the clamping block mechanism by a link mechanism and a shaft mechanism, wherein the link mechanism is pivotably connected to the clamping block mechanism and pivotably connected to the second jaw mechanism and wherein the shaft mechanism is movably mounted in the clamping block mechanism such that when the shaft mechanism is moved, the second jaw mechanism articulates between a clamping position and an open position.

16 Claims, 2 Drawing Sheets

DEVICE FOR CLAMPING THE EDGE OF A TABLE TOP

BACKGROUND OF THE INVENTION

The present invention relates to clamping devices for use in connection with medical diagnostic tables and particularly to clamping devices for use in connection with X-ray diagnostic tables. During the course of a medical examination it is typically necessary to mount one or more accessory devices to a diagnostic table such as poles for intravenous treatment of the patient, devices for controlling or monitoring the patient, patient support devices and other devices or paraphernalia necessary or desirable for assisting the patient simultaneously during the course of the patient's examination.

Diagnostic tables typically include an edge which is specially shaped for purposes of accomodating a most secure mating with a specially configured clamp. Such accomodative shaping of the edge of the table top of a diagnostic table is difficult and expensive to produce and may interfere with the analytical output of a given diagnostic machine. For example, if a table top having an edge 10 with a skin thickness T as shown in FIG. 1 is employed in an X-ray analysis in which X-ray photons A, B, C are projected at and pass through the patient (not shown) lying on the table, the effective skin thickness through which each of photons A, B, and C must penetrate varies greatly and may thus have a greatly varying effect on the degree to which photons A, B, and C are absorbed. Such a variation in absorption by the edge 10 of the table can thus distort the true shadow image of photons which pass through the patient being examined.

It is an object of the invention to provide a clamping device for diagnostic tables which obviates the necessity for specially shaped table edges and eliminates the attendant excessive costs and problems associated with having to construct specially shaped table top edges and clamping structures therefor.

SUMMARY OF THE INVENTION

In accordance with the invention there is provided a device for clamping the edge of a diagnostic table top comprising a clamping block mechanism having an inside face for abutting the side edge of the table top; a first jaw mechanism connected to the clamping block mechanism having an inner face for abutting one of the top or the bottom surfaces of the table top; a second jaw mechanism pivotably connected to the clamping block mechanism having an inner face for abutting the other of the top or bottom surfaces of the table top; the second jaw mechanism being connected to the clamping block mechanism by a link mechanism and a shaft mechanism, wherein the link mechanism is pivotably connected to the clamping block mechanism and pivotably connected to the second jaw mechanism and wherein the shaft mechanism is movably mounted in the block mechanism such that when the shaft mechanism is moved, the second jaw mechanism articulates between a clamping position and an open position.

The shaft mechanism is typically connected to the second jaw mechanism and movably mounted from end to end in a ball joint mechanism, the ball joint mechanism being pivotably mounted in the clamping block mechanism and the link mechanism being pivotably connected to the second jaw mechanism such that one of end to end and rotatable movement of the shaft mechanism within the ball joint mechanism causes the shaft mechanism, the second jaw mechanism, the ball joint mechanism and the link mechanism to simultaneously pivot.

In one embodiment, one end of the shaft mechanism may be fixedly connected from end to end to the second jaw mechanism. The other end of the shaft mechanism may be screwably engaged with a knob mechanism and the shaft mechanism is slidably mounted in the ball joint mechanism, the device further including a compressed spring mechanism mounted between the clamping block mechanism and the second jaw mechanism, the spring mechanism urging the clamping block mechanism and the second jaw mechanism away from each other along the axis of the shaft mechanism, the shaft mechanism being slidable from end to end within the ball joint by screwable turning of the knob mechanism around the screwably engaged end of the shaft mechanism. Alternatively, the one end of the shaft mechanism may be rotatably attached to the second jaw mechanism and the other end of the shaft mechanism is screwably engaged within the ball joint mechanism, the shaft mechanism being movable from end to end by screwable turning of the shaft mechanism within the screwably engaged ball joint mechanism. Alternatively, the other end of the shaft mechanism may be pivotably connected to a cam mechanism, the cam mechanism including a cam surface slidably engaged against an exterior surface of the device under the force of the tension of a compressed spring mechanism mounted between the clamping block mechanism and the second jaw mechanism and urging the second jaw mechanism and the clamping block mechanism away from each other, the shaft mechanism being slidably movable from end to end within the ball joint mechanism as the cam surface is slidably moved along the exterior surface.

In another embodiment the shaft mechanism may be screwably engaged at one end with the second jaw mechanism and rotatably mounted at the other end in the ball joint mechanism such that rotatable movement of the shaft mechanism moves the second jaw mechanism from end to end.

The shaft mechanism is typically connected to the second jaw mechanism and slidably mounted in a vertical slot in the clamping block, the link mechanism being pivotably connected to at least two points on the second jaw mechanism such that slidable movement of the shaft mechanism within the slot causes the link mechanism to pivot and the second jaw mechanism to articulate between substantially axially parallel clamping and open positions. The other end of the shaft mechanism may be screwably engaged with a knob mechanism, the device further including a compressed spring mechanism mounted between the clamping block mechanism and the second jaw mechanism, the spring mechanism urging the clamping block mechanism and the second jaw mechanism away from each other along the axis of the shaft mechanism, the shaft mechanism being slidable within the slot by screwable turning of the knob mechanism around the screwably engaged end of the shaft. Alternatively, the other end of the shaft mechanism may be pivotably connected to a cam mechanism, the cam mechanism including a cam surface slidably engaged against an exterior surface of the device under the force of the tension of a compressed spring mechanism mounted between the clamping block mechanism and the second jaw mechanism urging the second jaw mechanism and the clamping block mechanism away from each other, the shaft mechanism being slidably movable within the slot as the cam surface is slidably moved along the exterior surface. Alternatively, the shaft mechanism is screwably engaged at one end with the second jaw mechanism such that when the shaft mechanism is screwably turned, the link mechanism pivots, the shaft slides within the slot and the second jaw mechanism articulates between the clamping position and the open position.

Most preferably at least one of the jaw mechanisms includes a swivelable seat mechanism pivotably attached thereto, the swivelable seat mechanism including the inner face of the jaw mechanism for abutting the top or bottom surface of the table top.

DETAILED DESCRIPTION OF PREFERRED EMBODIMENTS

Following is a detailed description of most preferred embodiments of the invention.

Figure 2:
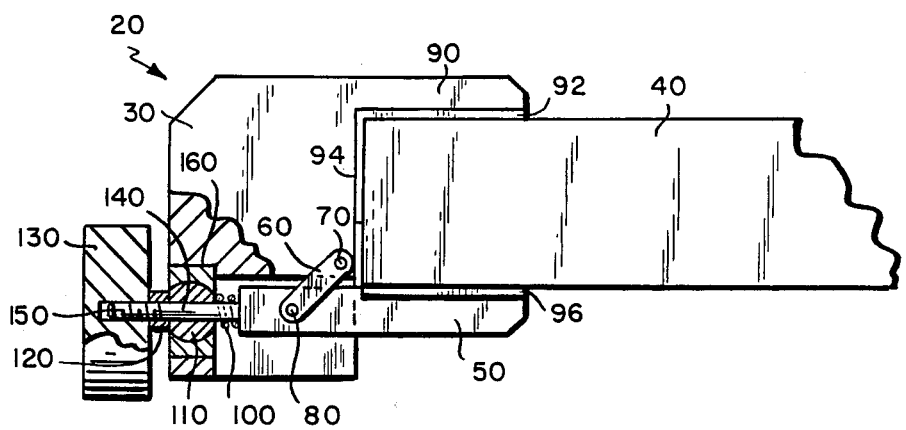
FIG. 2 is a partial cross-sectional, side view of a clamping device according to the invention having a knob mechanism screwably engaged with the end of a shaft connected to an articulatable jaw shown in a clamping position.
Figure 3:
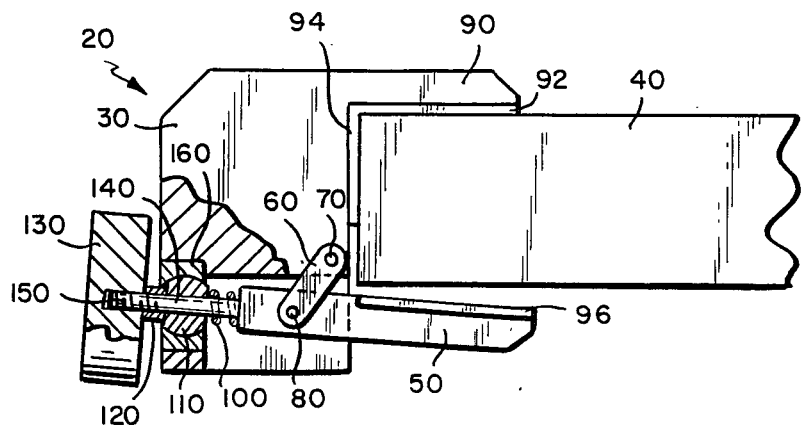
FIG. 3 is a partial cross-sectional, side view of the clamping device of FIG. 2 showing the articulatable jaw in an open position.

There is shown in FIGS. 2 and 3 an embodiment of a clamping device 20 according to the invention. The clamping device 20 comprises a main clamping block 30 having an inner face to which is preferably attached a pad 94 for abutting the side edge of a table top 40. A pair of jaws 50, 90 are attached to the clamping block 30, each jaw 50, 90 typically having pads 96, 92 respectively for abutting the lower and upper surfaces of the table top 40. Inasmuch as clamping block 30 and jaws 50, 90 typically comprise a coarse solid material such as wood, metal, plastic or the like, pads 92, 94, 96 are preferably provided for prevention of scratching of the table top 40, better frictional, grasping or adhesive capability and the like. Pads 92, 94, 96 most preferably comprise a compressible foam material such that upon engagement of the top, bottom and edge surfaces of the table top 40, minor irregularities in the contour or construction thereof such as bumps can be readily accomodated, fully engaged, cushioned and clamped more securely.

As shown in FIGS. 2 and 3 device 20 includes a link 60 pivotably connected to the block 30 at a pivot point 70 and pivotably connected to the jaw 50 at a pivot point 80. Such pivotable connections at points 70, 80 may be effected in any conventional manner such as by pins, rivets and the like. The rearward end of the jaw 50 is connected by conventional means to the forward end of a cylindrical shaft 140 such that the shaft 140 is not movable from end to end relative to the jaw 50. The shaft 140 extends rearwardly through a complementary aperture in a ball joint 110 and the shaft is slidably mounted in such aperture such that the shaft may slide from end to end within the aperture of the ball joint 110. A cylindrical spacing washer 120 is typically provided through which the shaft also extends immediately behind the ball joint 110. The rearward end 150 of the shaft 140 emerging through the washer 120 is threaded and a knob 130 having a complementary threaded aperture is engaged therearound. A spring 100 is coiled around the shaft 140 and is compressed between the rearward face of the jaw 50 and the forward face of the ball joint 100, the ends of the compressed spring 100 pushing against such faces, constantly urging the jaw 50 and the block 30, in which the ball joint 110 is mounted, apart from each other and thus constantly urging the forward face of the washer 120 against the rearward face of the joint 110 and constantly urging the forward face of the knob 130 against the rearward face of the washer 120.

Also as shown in FIGS. 2, 3 the ball joint 110 is rounded and mounted in a complementary rounded receiving housing 160 which is fixedly mounted in or otherwise fixedly attached to block 30. Such rounded mounting of ball joint 110 allows the joint 110 to pivot within housing 160 at least in the directions as shown between FIGS. 1 and 2. Most typically, the outermost surfaces of joint 110 are spherically shaped and joint 110 is thus pivotable within housing 160 in three-dimensions. The jaw 90 is shown in its typical configuration as an integral extension of block 30, although jaw 90 may otherwise be fixedly connected to block 30.

Jaw 50 is articulatable between a clamping or closed position as shown in FIG. 2 and an open position as shown in FIG. 3. In the clamping position, the knob 130 is screwed as far in one direction, clockwise or counter-clockwise, depending on the handedness of the screw 150, as may be necessary or desired to cause the upper surface of pad 96 to engage the bottom surface of table top 40 and exert secure clamping pressure on the bottom of the table 40, i.e. upward force exerted by pad 96 is opposed by downward pressure exerted by pad 92 as a result of the connection of both of jaws 50 and 90 to block 30.

Depending on the degree to which knob 130 is screwed in the clamping direction, jaw 50 can be made to exert a variable amount of clamping force. As knob 130 is screwed in reverse from the clamping position shown in FIG. 2, the force between the forward face of knob 130 and the rearward face of washer 120 gradually decreases, and in turn the force between the forward face of washer 120 and joint 110 decreases, and in turn spring 100 gradually expands under its compressed tension causing jaw 50 to move forwardly and to reverse pivot (downwardly) around pivot point 80 and further causing shaft 140 which is mounted in joint 110 to reverse pivot therein. Depending on the degree of reverse turning of knob 130, jaw 50 may thus be articulated from its original clamping position to an open position in which pad 96 is no longer exerting an upward clamping pressure on the bottom surface of table top 40 as shown for example in FIG. 3. As shown in FIG. 3, as jaw 50 is articulated from its original clamping position, ball joint 110 pivots together with shaft 140, jaw 50 and link 60. In an alternative embodiment of the invention as more fully described hereinafter, ball joint 110 and its associated housing 160 may be replaced with a vertical slot for purposes of mounting shaft 140 in block 30 and thus alternatively allow jaw 50 to articulate between clamping and open positions. In such an alternative embodiment, the link 60 is typically provided with two pivot points on jaw 50 such that the jaw preferably articulates between two substantially axially parallel positions and the shaft 140 slidably moves up and down (and from end to end) in the vertical mounting slot.

Figure 4:
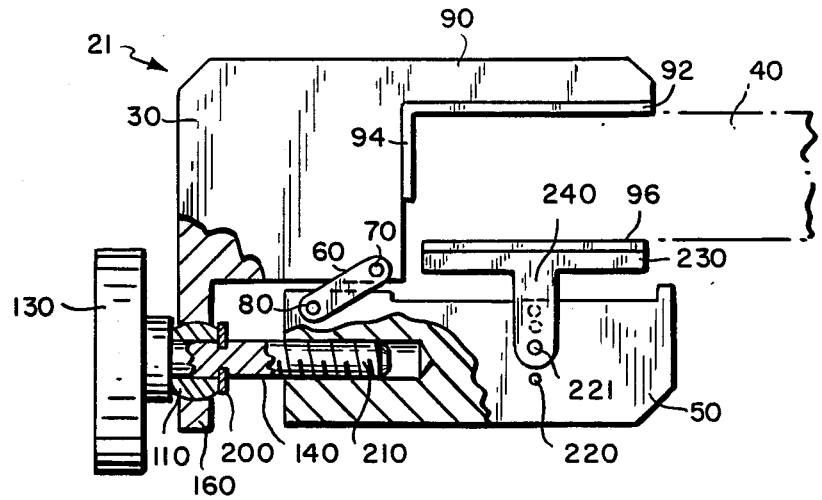
FIG. 4 is a partial cross-sectional, side view of another clamping device according to the invention having a shaft element screwably engaged with an articulatable jaw and having a swivelable seat attached to the inner face portion of the articulatable jaw with the articulatable jaw shown in a closed position.

FIG. 4 illustrates several alternative embodiment features relative to the specific embodiment shown in FIGS. 2, 3. For example, as shown in FIG. 4, the end 210 of shaft 140 which is connected to jaw 50 may be screwably engaged with a complementary threaded aperture in jaw 50 as opposed to providing a screwable engagement between knob 130 and the other end 150 of the shaft 140 as shown in FIGS. 2, 3.

In the FIG. 4 embodiment, knob 130 is fixedly attached to the other end of the shaft 140 such that when knob 130 is turned, jaw 50 is either drawn toward or away from knob 130 depending on the handedness of the screwable engagement of shaft end 210 with jaw 50. A washer 200 is typically provided, which is locked into a complementary groove provided on shaft 140 adjacent the front face of ball joint 110 in order to prevent shaft 140 from uncontrollably and slidably moving from end to end within ball joint 110 and thus prevent jaw 50 from uncontrollably articulating.

Similar to the operation of the device 20 as described with reference to FIGS. 2, 3, the jaw 50 of device 21, FIG. 4, can be articulated between a clamping position as shown in FIG. 4 and an open position (not shown). In the clamping position shown in FIG. 4, knob 130 is turned to such a necessary and desired degree as to cause jaw 50 to be pivoted upwardly so as to cause pad 96 to engage the bottom of table top 40 and exert a necessary and desired amount of clamping pressure on the bottom of table top 40 which is opposed by the pressure exerted by pad 92 on the top of the table top 40. With reference to FIG. 4, as knob 130 is turned (rotated) in a direction which causes jaw 50 to move forwardly away from knob 130, jaw 50 pivots around point 80, link 60 pivots around point 70, and shaft 140 and joint 110 pivot within housing 160 thus causing jaw 50 to pivot downwardly to any desired open position similar to the opening operation described with reference to FIGS. 2, 3. During an opening operation of device 21, FIG. 4, the initial pushing of jaw 50 forwardly away from knob 130 by the turning of the screw 210 within jaw 50 is opposed by a pressure between the rearward face of washer 200 and the forward face of joint 110.

As shown in FIG. 4, jaw 50 is provided on its inner clamping face with a swivelable seat 230 which is provided the pad 96. The seat 230 is provided with a swivel arm 240 which is attached to the body of the jaw 50 at a pivot point 221 by conventional means. Most preferably, the arm 240 is of such length that the seat 230 may be adjustably connected to the body of the jaw 50 at any of a variety of differing level pivot points 220 such that the device 21 may be clamped to table tops 40 of varying thicknesses. A pivot pin which may be readily removed from and inserted into apertures 220 is suitable for such adjustable mounting of swivel seat 230. The swivel capability of seat 230 further allows the device 21 to clamp a table top 40 whose top and bottom surfaces are not parallel. The adjustable swivel seat 230 described with reference to the FIG. 4 embodiment may be incorporated into any embodiment of the invention described herein.

Figure 1:
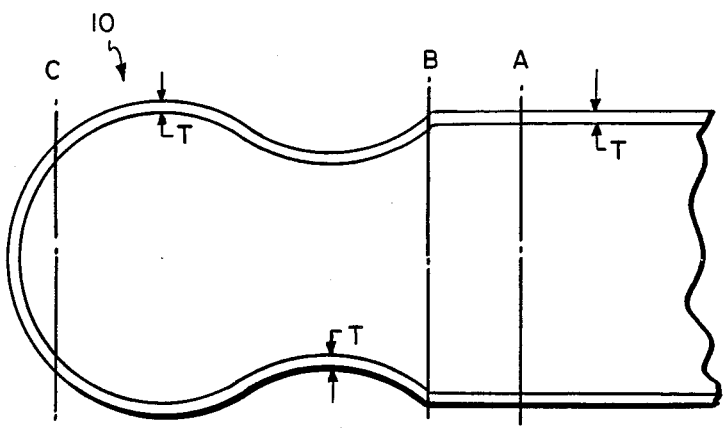
FIG. 1 is a cross-sectional view of diagnostic table top edge which is specially shaped to accomodate a certain prior art clamping device.

In an embodiment not specifically shown in the Figures, shaft 140, FIGS. 1-3, may alternatively be screwably engaged within ball seat 110 itself as opposed to being screwably engaged with the knob 130 or the jaw 50. In such an embodiment one end of the shaft 140 is rotatably attached to jaw 50 and the other end of the shaft is fixedly attached to knob 130 such that when knob 130 is turned, the shaft 140 moves forwardly or backwardly within ball seat 110 under the screwing force and, by virtue of the shaft 140 attachment to jaw 50, causes jaw 50 to pivot around point 80, shaft 140 and ball joint 110 to pivot within housing 160 and link 60 to pivot around point 70. As described with reference to FIGS. 2-4, such pivoting enables the jaw 50 to be articulated between the clamping and open positions.

Figure 5:
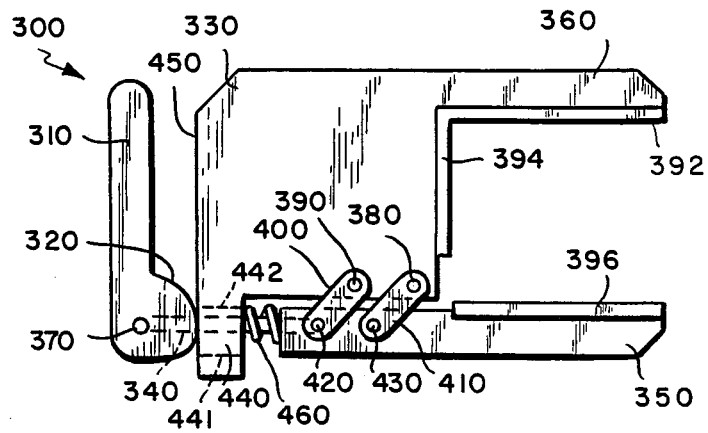
FIG. 5 is a partial cross-sectional, side view of another clamping device according to the invention showing a levered cam actuator attached to a shaft which is in turn attached to an articulatable jaw with the articulatable jaw shown in a clamping position; and, FIG. 6 is a partial cross sectional, side view of the clamping device of FIG. 5 showing the articulatable jaw in an open position.
Figure 6:
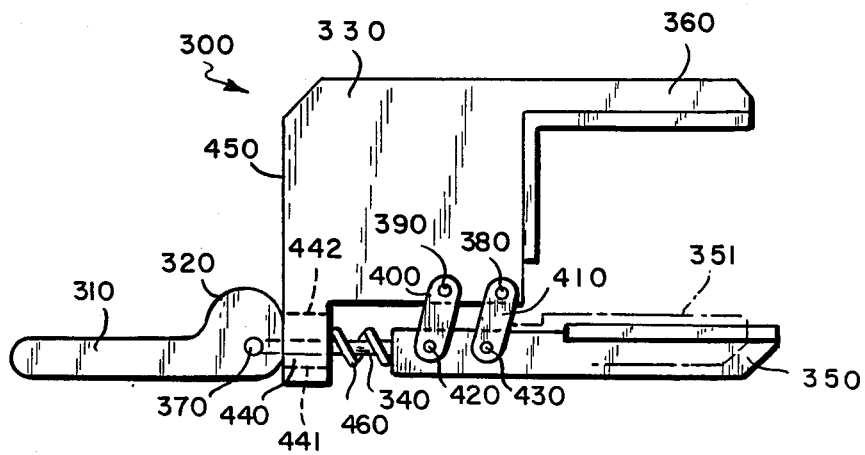

FIGS. 5 and 6 depict another embodiment of a device 300 according to the invention with the articulatable jaw 350 in a clamping position, FIG. 5, and an open position, FIG. 6. As shown in FIGS. 5, 6 the device 300 utilizes a levered cam 310 for purposes of actuating jaw 350 forwardly and backwardly through a shaft 340. The device 300 includes a pair of links 400, 410 which are pivotably attached to the mounting block 330 at points 390, 380 respectively and which are pivotably attached at points 420, 430 respectively to the jaw 350 by conventional means. The shaft 340 is fixedly attached at one end to the jaw 350 and pivotably attached at its other end 370 to the levered cam 310 by conventional means. The mounting block 330 includes a slot 440 extending vertically between dashed cross-sectional lines 441, 442 in and through which shaft 340 is mounted and extends. The width of slot 440 is typically slightly greater than the width or diameter of shaft 340 such that shaft 340 fits comfortably and slidably within the slot 440 but not so loosely as to allow shaft 340 to uncontrollably float from side to side within the slot 440. A compressed spring 460 is coiled around shaft 340 such that one end of the spring 460 engages the rearward end of jaw 350 and the other end of the spring 460 engages the forward end of the mounting block 330 around the edges of slot 440. The spring 460 being constantly compressed thus constantly urges jaw 350 and block 330 away from each other and, by virtue of the cam's 310 attachment to the shaft 340, maintains the cam surface 320 of the cam 310 under a constant frictional pressure with the outside surface 450 of the block 330 such that the cam 310 will remain in a stable position when essentially any local area of the entire contour of cam surface 320 is in contact with the outer surface 450 of the block 330.

The cam surface 320 is of such a width that it is wider than the width of slot 440. The cam surface 320 thus frictionally engages the outside surface 450 of the block 330 around the edges of slot 440. As shown in FIGS. 5, 6 the cam surface 320 is contoured such that in the clamping position shown in FIG. 5 the shaft 340 and jaw 350 are drawn to their rearwardmost positions and in the position shown in FIG. 6 the shaft 340 and jaw 350 are in their forwardmost positions; and, between the positions shown in FIGS. 5, 6 the cam surface 320 is contoured such that the shaft 340 and jaw 350 are gradually released, through the connection 370 of cam 310 to shaft 340, from their rearwardmost position 351 to their forwardmost position.

The device 300, FIGS. 5, 6 is preferably provided with a pair of links 400, 410 and a pair of pivotable connections 420, 430 to the jaw 350. When the lever 310 is pulled backwardly from its position as shown in FIG. 5, the cam surface 320 slides along surface 450, and the cam 310 pivots around point 370 allowing shaft 340 to be drawn forwardly under the influence of the compressed tension force of spring 460 and the shaft's 340 connection to jaw 350. As shaft 340 is drawn forwardly, links 400, 410 pivot simultaneously around points 390, 380 and jaw 350 is forced downwardly by links 400, 410. As shown in FIGS. 5, 6 links 400, 410 are connected at pivot points 390, 380 and 420, 430 which are preferably aligned along lines which are substantially parallel to the axis of jaw 50. By virtue of the preferred substantially axially parallel alignment of pivots 420, 430 and the fixed connection of shaft 340 to jaw 350, as links 400, 410 pivot, jaw 350 and shaft 340 move downwardly to positions which are substantially axially parallel to their original positions. The rearward end portion of shaft 340 which is mounted in slot 440 also slides downwardly through slot 440 during the course of the operation described above and as depicted in FIGS. 5, 6. As shown in FIG. 6 when the cam 310 has been lowered to the position shown and the cam surface 320 has been levered to the orientation shown, the jaw 350 has been lowered to its most open position from its original clamping position 351 (also shown in FIG. 5), both positions being substantially axially parallel to each other. Although the FIG. 5 position and jaw position 351, FIG. 6, have been described as the clamping position, it can be seen from FIG. 6 and the operation of device 300 generally that any position of jaw 350 intermediate the positions shown in FIGS. 5 and 6 could act as clamping positions for table tops of varying widths. Preferably, however, a swivel seat such as seat 230 described with reference to FIG. 4 is utilized in connection with device 300 to provide variable table top thickness clamping positions.

As described briefly above, the cam lever 310 of device 300 may be less preferably replaced with a knob which is screwably engaged with the end of shaft 340, FIGS. 5, 6 and operate to move jaw 350 forwardly and backwardly as described with reference to knob 130 and shaft end 150, FIGS. 2, 3; or, also less preferably, the cam lever 310 may be replaced with a knob which is fixedly attached to the rearward end of shaft 340 and the forward end of shaft 340 may be screwably engaged with jaw 350 and operate to move jaw 350 forwardly and backwardly as described with reference to device 21, FIG. 4. Further with regard to the preferred embodiments specifically shown in FIGS. 2-3, an alternative but less preferred embodiment of the device 20 which is shown in FIGS. 2-3 could be accomplished wherein a levered cam having a cam surface similar to that described with reference to FIGS. 5-6 is substituted for the knob 130 and threaded shaft end 150. In such an alternative, but less preferred embodiment, the end 150 of shaft 140 could be pivotably attached to a levered cam and an appropriately contoured cam surface would preferably engage the rearward surface of washer 120. The operation of such a device would be similar to that described above with reference to FIGS. 2-3 except that movement of the shaft would be effected by pivoting of the levered cam as opposed to screwable turning of knob 130.

It can thus be seen with respect to all embodiments of the invention that the shaft mechanism is movably mounted at one end in the clamping block and connected to the articulatable jaw at the other end; and that upon actuation of the shaft to undergo an appropriate movement within the block, i.e. either forward/backward or rotatable movement relative to the block, the link mechanism(s) will pivot and the jaw will be caused to articulate.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. Device for clamping the edge of a diagnostic table top comprising:
   a clamping block means having an inside face for abutting the side edge of the table top;
   a first jaw means connected to the clamping block means having an inner face for abutting one of the top or the bottom surfaces of the table top;
   a second jaw means pivotably connected to the clamping block means having an inner face for abutting the other of the top or bottom surfaces of the table top;
   the second jaw means being connected to the clamping block means by a link means and a shaft means, wherein the link means is pivotably connected to the second jaw means and wherein the shaft means is movably mounted in the block means such that when the shaft means is moved, the second jaw means articulates between a clamping position and an open position;
   the shaft means being connected to the second jaw means and movably mounted in a ball joint means, the ball joint means being pivotably mounted in the clamping block means and the link means being pivotably connected to the second jaw means such that one of longitudinal and rotatable movement of the shaft means within the ball joint means causes the shaft means, the second jaw means, the ball joint means and the link means to simultaneously pivot.

2. The device of claim 1 wherein one end of the shaft means is fixedly connected to the second jaw means.

3. The device of claim 2 wherein the other end of the shaft means is screwably engaged with a knob means and the shaft means is slidably mounted in the ball joint means, the device further including a compressed spring means mounted between the clamping block means and the second jaw means, the spring means urging the clamping block means and the second jaw means away from each other along the axis of the shaft means, the shaft means being longitudinally slidable within the ball joint means by screwable turning of the knob means around the screwably engaged end of the shaft means.

4. The device of claim 2 wherein the one end of the shaft means is rotatably attached to the second jaw means and the other end of the shaft means is screwably engaged within the ball joint means, the shaft means being longitudinally movable by screwable turning of the shaft means within the screwably engaged ball joint means.

5. The device of claim 2 wherein the other end of the shaft means is pivotably connected to a cam means, the cam means including a cam surface slidably engaged against an exterior surface of the device under the force of the tension of a compressed spring means mounted between the clamping block means and the second jaw means and urging the second jaw means and the clamping block means away from each other, the shaft means being longitudinally movable within the ball joint means as the cam surface is slidably moved along the exterior surface.

6. The device of claim 1 wherein the shaft means is screwably engaged at one end with the second jaw means and rotatably mounting at the other end in the ball joint means such that rotatable movement of the shaft means moves the second jaw means longitudinally.

7. The device of claim 1 wherein at least one of the jaw means includes a swivelable seat means pivotably attached thereto, the swivelable seat means including the inner face of the jaw means for abutting the top or bottom surface of the table top.

8. The device of claim 1 wherein the first jaw means is integrally connected to the clamping block means.

9. The device of claim 1 wherein the inside face of the clamping block means and the inner faces of the jaws are configured to mate with a substantially square edged table top when the device is in the clamping position.

10. Device for clamping the edge of a diagnostic table top comprising:
   a clamping block means having an inside face for abutting the side edge of the table top;
   a first jaw means connected to the clamping block means having an inner face for abutting one of the top or the bottom surfaces of the table top;
   a second jaw means pivotably connected to the clamping block means having an inner face for abutting the other of the top or bottom surfaces of the table top;
   the second jaw means being connected to the clamping block means by a link means and a shaft means, wherein the link means is pivotably connected to the clamping block means and pivotably connected to the second jaw means and wherein the shaft means is movably mounted in the block means such that when the shaft means is moved, the second jaw means articulates between a clamping position and an open position;
   wherein one end of the shaft means is connected to the second jaw means and slidably mounted in a vertical slot in the clamping block means, the link means being pivotably connected to at least two points on the second jaw means such that slidable movement of the shaft means within the slot causes the link means to pivot and the second jaw means to articulate between substantially axially parallel clamping and open positions.

11. The device of claim 10 wherein the other end of the shaft means is pivotably connected to a cam means, the cam means including a cam surface slidably engaged against an exterior surface of the device under the force of the tension of a compressed spring means mounted between the clamping block means and the second jaw means urging the second jaw means and the clamping block means away from each other, the shaft means being slidably movable within the slot as the cam surface is slidably moved along the exterior surface.

12. The device of claim 10 wherein the shaft means is screwably engaged at one end with the second jaw means such that when the shaft means is screwably turned, the link means pivots, the shaft slides within the slot and the second jaw means articulates between the clamping position and the open position.

13. The device of claim 10 wherein the first jaw means is integrally connected to the clamping block means.

14. The device of claim 10 wherein the inside face of the clamping block means and the inner faces of the jaws are configured to mate with a substantially square edged table top when the device is in the clamping position.

15. Device for clamping the edge of a diagnostic table top comprising:
   a clamping block means having an inside face for abutting the side edge of the table top;
   a first jaw means connected to the clamping block means having an inner face for abutting one of the top or the bottom surfaces of the table top;
   a second jaw means pivotably connected to the clamping block means having an inner face for abutting the other of the top or bottom surfaces of the table top;
   the second jaw means being connected to the clamping block means by a link means and a shaft means, wherein the link means is pivotably connected to the second jaw means and wherein the shaft means is movably mounted in the block means such that when the shaft means is moved, the second jaw means articulates between a clamping position and an open position; the shaft means being connected to the second jaw means and slidably mounted in a vertical slot in the clamping block means, the link means being pivotably connected to at least two points on the second jaw means such that slidable movement of the shaft means within the slot causes the link means to pivot and the second jaw means to articulate between substantially axially parallel clamping and open positions and wherein the shaft means is screwably engaged with a knob means, the device further including a compressed spring means mounted between the clamping block means and the second jaw means, the spring means urging the clamping block means and the second jaw means away from each other along the axis of the shaft means, the shaft means being slidable within the slot by screwable turning of the knob means around the screwably engaged end of the shaft means.

16. Device for clamping the edge of a diagnostic table top comprising:
   a clamping block means having an inside face for abutting the side edge of the table top;
   a first jaw means connected to the clamping block means having an inner face for abutting one of the top or the bottom surfaces of the table top;
   a second jaw means pivotably connected to the clamping block means having an inner face for abutting the other of the top or bottom surfaces of the table top;
   the second jaw means being connected to the clamping block means by a link means and a shaft means, wherein the link means is pivotably connected to the second jaw means and wherein the shaft means is movably mounted in the block means such that when the shaft means is moved, the second jaw means articulates between a clamping position and an open position, the shaft means being connected to the second jaw means and slidably mounted in a vertical slot in the clamping block means, the link means being pivotably connected to at least two points on the second jaw means such that slidable movement of the shaft means within the slot causes the link means to pivot and the second jaw means to articulate between substantially axially parallel clamping and open positions and wherein at least one of the jaw means includes a swivelable seat means pivotably attached thereto, the swivelable seat means including the inner face for abutting the top or bottom surface of the table top.

* * * * *